United States Patent [19]

Lamper et al.

[11] Patent Number: 5,036,324
[45] Date of Patent: Jul. 30, 1991

[54] PULSE COMPRESSION TECHNIQUE FOR HIGH DUTY FACTOR RADAR

[75] Inventors: David Lamper, St. Charles; Thomas L. Grettenberg, St. Louis, both of Mo.

[73] Assignee: Electronics and Space Corporation, St. Louis, Mo.

[21] Appl. No.: 593,027

[22] Filed: Oct. 5, 1990

[51] Int. Cl.⁵ .................. G01S 13/28; G01S 7/295; G06F 15/332

[52] U.S. Cl. ................... 342/132; 342/135; 342/195; 342/196; 364/726

[58] Field of Search .............. 342/132, 135, 136, 145, 342/195, 196, 197, 194, 189; 364/517, 725, 726

[56] References Cited

U.S. PATENT DOCUMENTS

| | | | |
|---|---|---|---|
| 3,660,841 | 5/1972 | Powers et al. | 342/195 |
| 3,747,099 | 7/1973 | Wong | 342/132 |
| 4,003,051 | 1/1977 | Fitzgerald et al. | 342/136 X |
| 4,618,863 | 10/1986 | Collins | 342/194 |
| 4,899,159 | 2/1990 | Marchant | 342/195 X |

*Primary Examiner*—Gilberto Barron, Jr.
*Attorney, Agent, or Firm*—Polster, Polster and Lucchesi

[57] ABSTRACT

A method of signal processing for use in high duty factor radars for detecting targets at ranges both shorter and longer than a minimum range defined by a transmitted pulse having a defined pulse length. A coded pulse coherent array waveform is transmitted and a return signal which is a waveform reflected off a target is received. The reflected waveform is sampled and time shifted by adding data to its beginning and end. The vector is then processed (pulse compressed) to obtain target information. Target information can now be obtained which is normally in a "blind zone", because the distance of the target from the radar is such that it appears during an interval when sampling is not done because of waveform transmission.

16 Claims, 13 Drawing Sheets

PULSE COMPRESSION TECHNIQUE FOR HIGH DUTY FACTOR RADAR

BACKGROUND OF THE INVENTION

This invention relates to radar systems, and more particularly, to a method of pulse compression processing which allows for detection of targets at ranges both shorter and longer than a "minimum" detection range of the radar.

In coherent array radar systems, a complex coded pulse is modulated onto a carrier and the resultant waveform is upconverted to a frequency transmitted by the radar. The received, return signal is downconverted to a frequency which is compensated for possible doppler modulation As part of processing the return signal, it is supplied to a phase detector. In general, the phase angle varies for each received pulse. Further, prior signal processors utilized a pulse compression technique which is the equivalent of a tapped delay line. A received signal, starting at the end of a transmission period, is input to the delay line and will arrive at the nth tap of the delay at a time which is a function of the propagation rate of the signal through the line. The signal has peaks representing targets reflecting the transmitted signal It will be appreciated that during pulse transmission, the radar receiver is blanked out. As a result, if the round trip time for a transmitted signal reflected back to the radar is less than the blanking time, the peaks will occur in "blind zones", i.e. they are masked by the transmitted pulse since they are propagating through the delay line at the same time blanking is occurring. As a consequence, targets within the blind zone will not be identified during signal processing.

SUMMARY OF THE INVENTION

Among the several objects of the present invention may be noted the provision of a method for use with a high duty factor radar; the provision of such a method which substantially reduces or eliminates "blind zones" in the detection of targets by the radar; the provision of such a method to allow detection of targets at ranges shorter than, and longer than, a minimum range determined by the pulse length of a transmitted signal; the provision of such a method which involves pulse compression; the provision of such a method which is involves Fast Fourier Transform (FFT) techniques; the provision of such a method by the pulse compression allows the processor to look back into the near range blind zone, and forward into the far range blind zone; the provision of such a method in which the total vector length for the received signal is adjusted to correspond to a power of two; the provision of such a method in which pulse code processing is done using a Fourier transform matrix; and, the provision of such a method which is implemented in a radar utilizing parallel processing techniques and employing FFT's having a limited instruction set so to increase data processing speed.

In accordance with the invention, generally stated, a method of signal processing is disclosed for use in high duty factor radars for detecting targets at ranges both shorter and longer than a minimum range. A coded pulse coherent array waveform is transmitted and a waveform reflected off a target is received as a return signal. The reflected waveform is sampled. Zeros are added at the beginning and end of the sampled data. The resultant data vector is then pulse compressed to obtain the target information. The information, which is normally in a "blind zone", because the distance of the target from the radar is such that it occurs in the interval when sampling is not done because of waveform transmission, can now be obtained. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
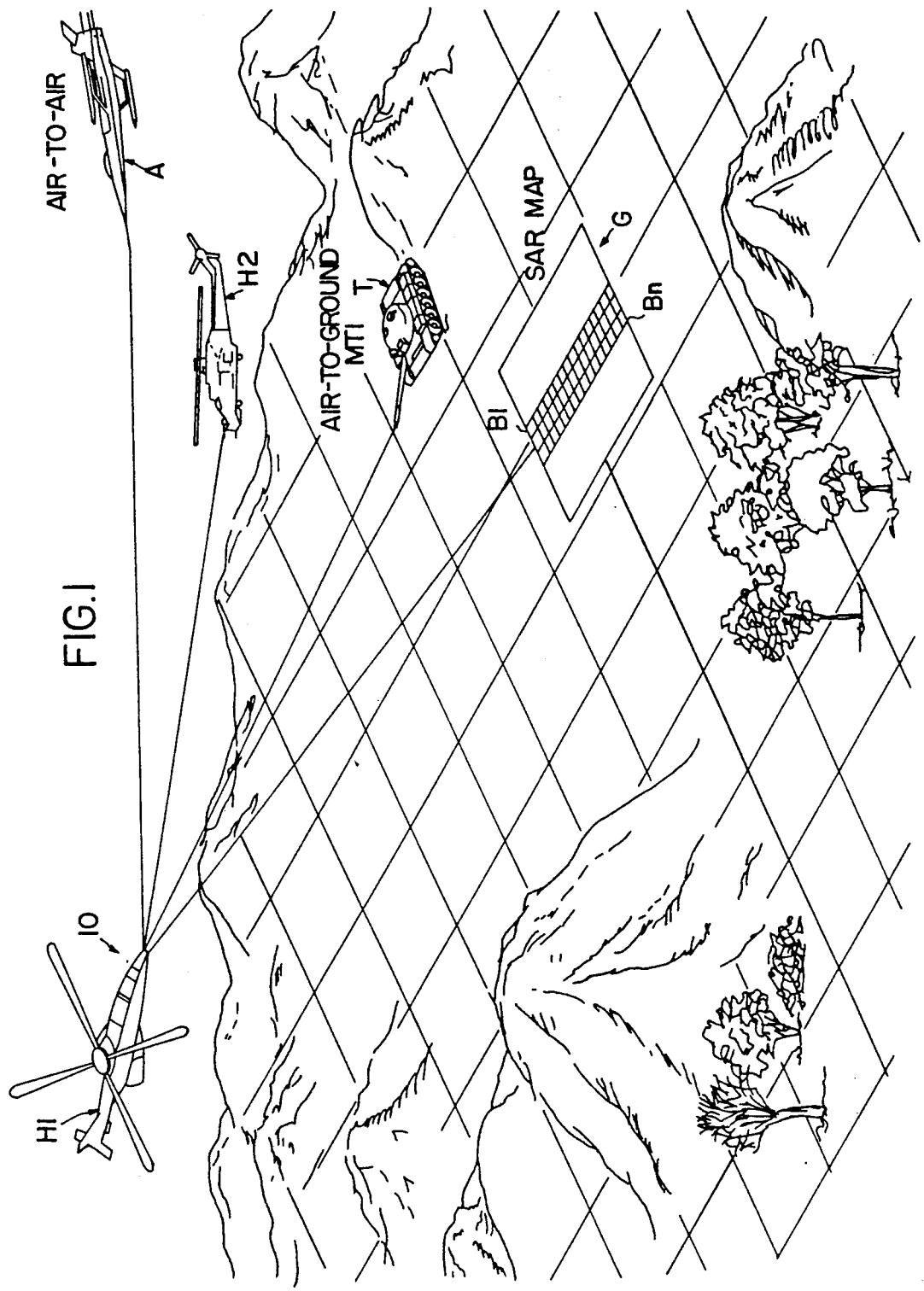
FIG. 1 is a representation of applications for a high duty factor radar system of the present invention.

Referring to the drawings, a high duty factor radar system, in which the method of the present invention is implemented, is for airborne and ground applications, and is indicated generally 10. While shown as a helicopter mounted unit in FIG. 1, the radar system can be installed on ground vehicles as well. Radar system 10 has a multimode operating capability and FIG. 1 indicates some of these capabilities. When installed on an airborne vehicle, e.g. helicopter H1, it can be used to locate, identify, and track other aircraft such as the helicopter H2, or fighter aircraft A. It can also be used to locate and track ground vehicles such as a tank T. In both the ground and airborne tracking mode, the system has a moving target indication (MTI) capability so it can locate, identify, and track a number of moving vehicles. Further, as an airborne system, it can function in a synthetic array radar (SAR) mode for ground mapping, and also for air-to-ground ranging. In the mapping mode, for a given area G, the radar divides the area into a plurality of uniquely identified bins B1 ... Bn. Within each bin, the system locates various features based upon a predetermined resolution (i.e. 15 ft., 30 ft., etc.). A map can then be generated having a predetermined size. In addition to the above, the system also has a "sniff" mode allowing it to detect enemy jamming and so avoid frequencies on which jamming occurs. At the same time, the system is designed to itself avoid detection. While radar system 10 is more fully described in co-pending U.S. patent application Ser. No. 07/593,101, which is incorporated herein by reference, the more salient features of the radar system will be described.

Figure 2:
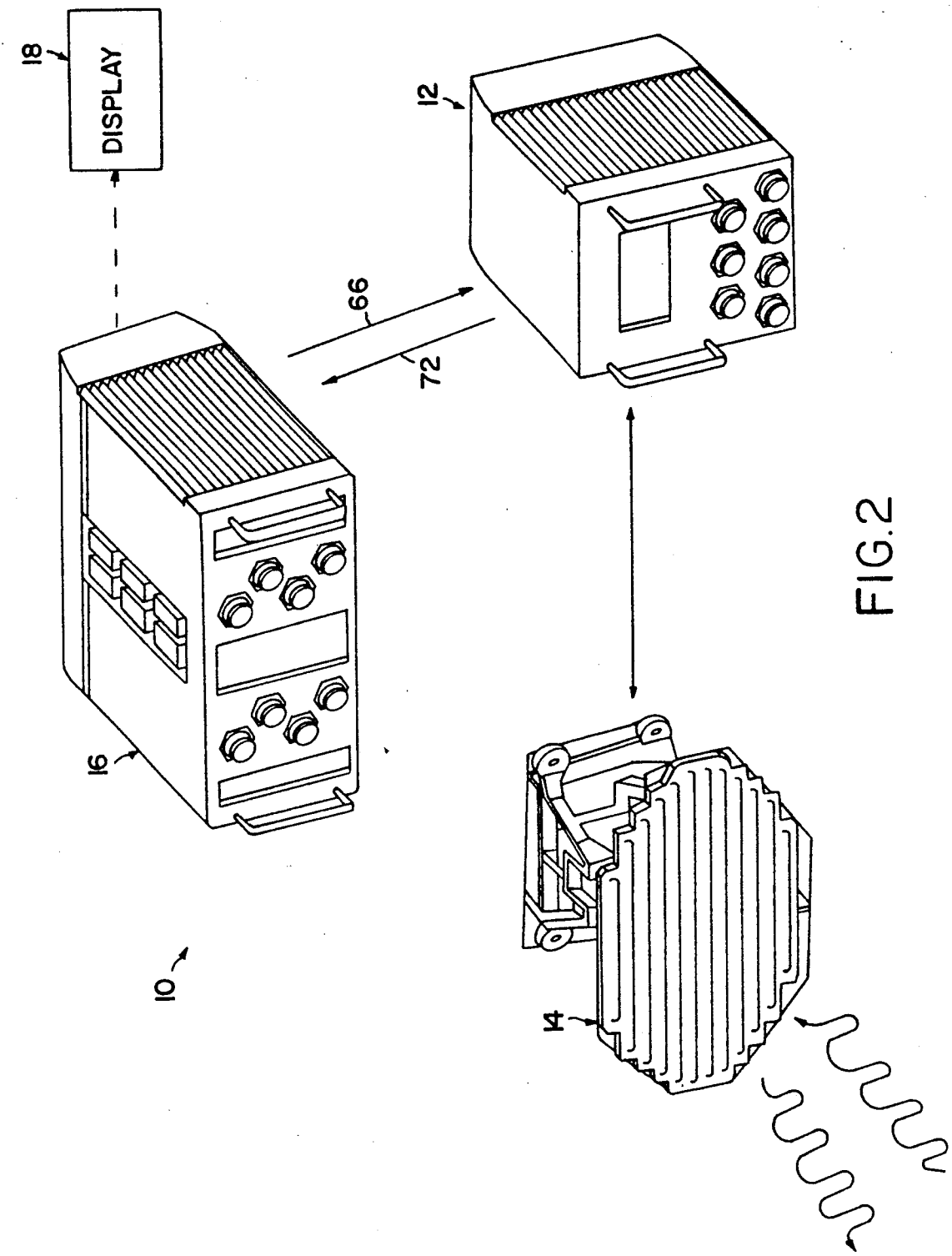
FIG. 2 is a perspective view of the components comprising the system.

Radar system 10 includes three components as shown in FIG. 2. These include a transmitter/receiver unit 12, an antenna 14, and a signal processor 16. Depending upon the particular operational mode of the radar system, it may also include a display 18. In general, system 10 is designed for operation in the X and Ku frequency bands. Operation in the Ku band allows the system to transmit very narrow beamwidths (which is preferable for low speed target detection). Operation in the X band gives improved performance in rain and fog conditions, allows for longer detection ranges, and permits faster track and update rates for a given transmitter power and antenna aperture.

Figure 3:
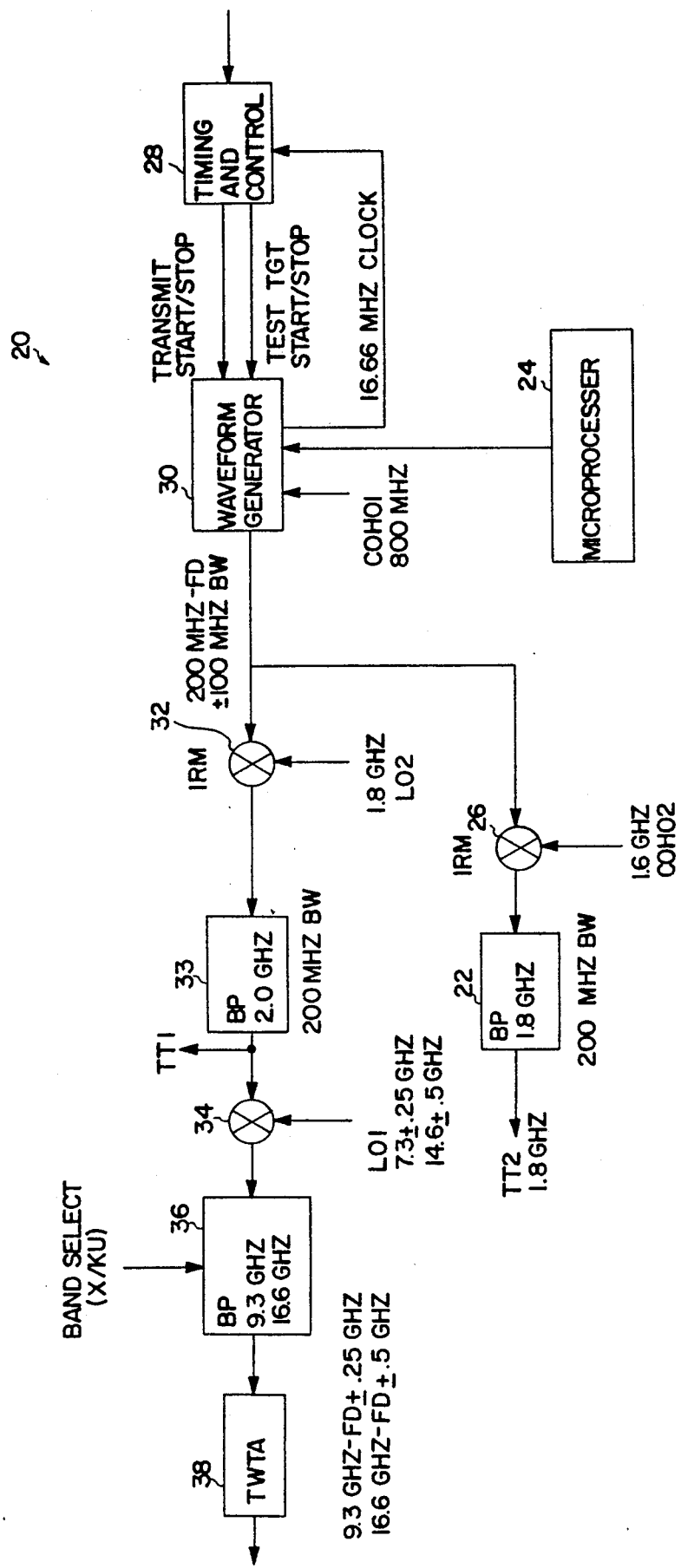
FIG. 3 is a block diagram of the transmitter portion of the radar system.
Figure 4:
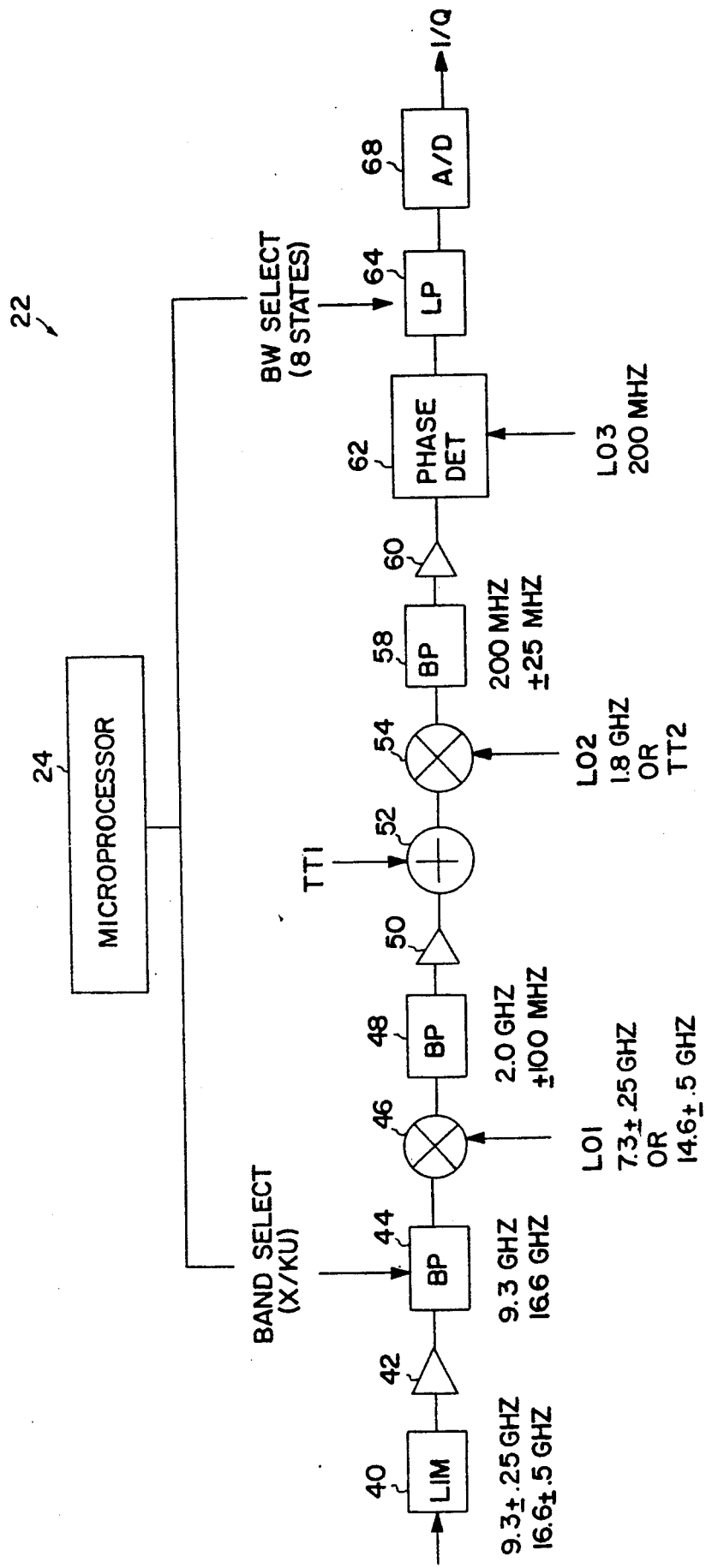
FIG. 4 is a block diagram of the receiver portion of the system.

With respect to the various components, transmitter/receiver 12 has a transmitter section 20 (see FIG. 3), and a receiver section 22 (see FIG. 4). Both sections are controlled by a microprocessor 24. Transmitter section 20 is capable of transmitting a range of linear FM coded waveforms at an output power level of 100 w. Antenna 14 is a low sidelobe antenna used for both signal transmission and reception. It has a peak sidelobe level, for example, of approximately −35 db, and an average sidelobe level, for example, of approximately −45 db. The antenna is preferably a two-axis monopulse antenna. It will be understood that while designed for use with antenna 14, the transmitter/receiver and processor are usable with other antenna systems. Processor 16 employs a parallel processing architecture utilizing Fast Fourier Transforms (FFT's). This enables the processor to have a throughput of approximately 3,000,000,000 operations/sec.; or, 3 BOP's.

Referring to FIG. 3, transmitter section 20 includes a linear FM waveform generator 30, dual upconverter stages 32 and 34, a bandpass filter 36, and a power amplifier 38. Waveform generator 30 is initialized by microprocessor 24 and uses a clock signal from an exciter assembly 35 (see FIG. 5). This clock signal is supplied at a frequency of 4F1, where F1 is the center frequency of the linear FM signal being produced. This center frequency is 200 Hz, for example. The output of generator 30 is mixed with a signal having a frequency of, for example, 1.8 GHz, which is also supplied by the exciter assembly. The resultant signal is a linear FM signal having a center frequency of 2.0 GHz. After passing through a bandpass filter 33, the signal is mixed with one of two output signals from the exciter assembly to produce a linear FM signal having either an X band frequency of 9.3 GHz, for example, or a Ku band frequency of, for example, 16.6 GHz. To avoid jamming, the Ku frequency has a frequency hopping bandwidth of 1000 MHz, and the X frequency a frequency hopping bandwidth of 500 MHz. From generator 30, the waveform is provided to a traveling wave tube (TWT) amplifier 38 having a power output of 100 w. From the amplifier, the waveform is routed to antenna 14 for transmission.

Referring to FIG. 4, receiver section 22 is a two-channel, gain and phase balanced, linear, monopulse receiver. A received pulse is first directed to a signal limiter 40, and then sequentially to an amplifier 42, and a bandpass filter 44. From filter 44, the signal is supplied to a mixer 46 where it is mixed with a Ku or X band signal as appropriate. The resultant intermediate frequency (IF) output signal of the mixer is again filtered, by a bandpass filter 48, and amplified by an amplifier 50. At summing point 52, the signal is combined with a signal TTI. The resultant signal is an input to a mixer 54 where it is mixed with a lower frequency signal (e.g. 1.8 GHz.). The resultant output is again filtered, this time by a bandpass filter 58. After further amplification at 60, the signal is supplied to a phase detector 62. A frequency input (e.g. 200 MHz) to the detector is also provided by exciter assembly 35 of FIG. 5. Here it is split into in-phase and quadrature-phase components I and Q respectively. From phase detector 62, the I and Q components of the waveform are passed to a filter 64 whose bandwith is controlled by microprocessor 24.

Figure 5:
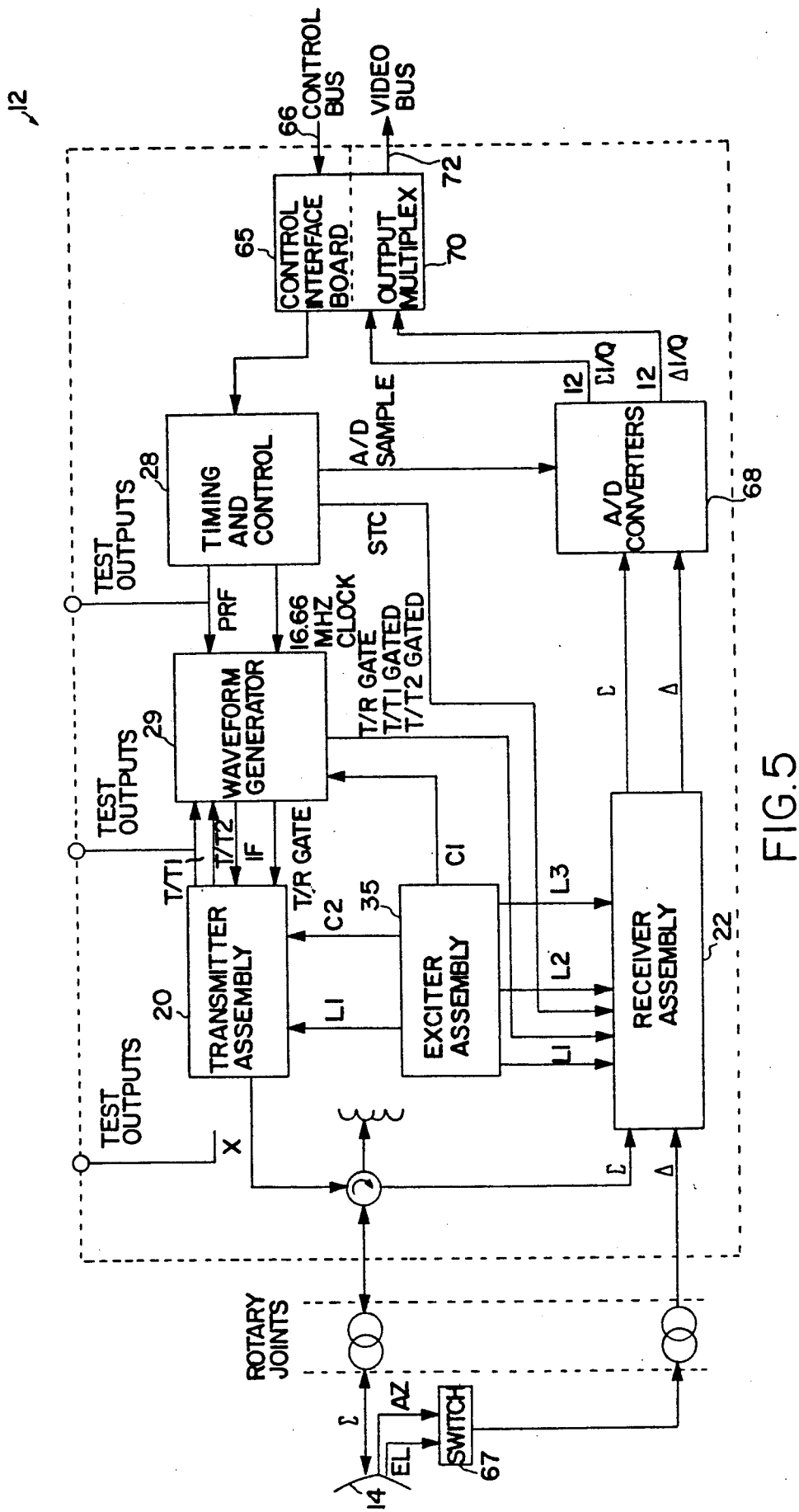
FIG. 5 is a block diagram of the transmitter/receiver unit of the system.
Figure 6:
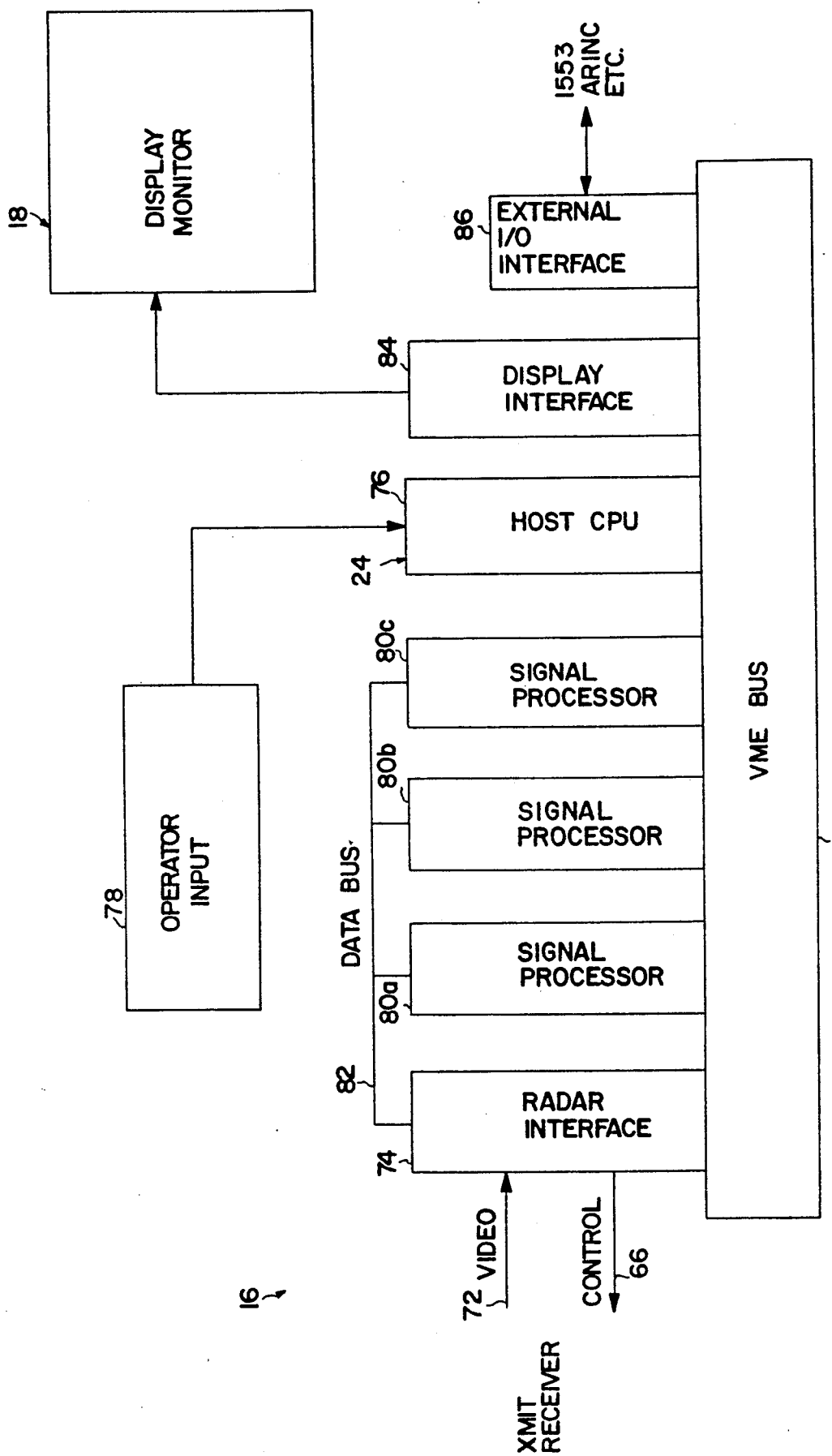
FIG. 6 is a block diagram of the signal processor of the system.

Referring to FIG. 5, transmitter/receiver 12 is shown in a different modular format than that shown in FIGS. 3 and 4. The transmitter/receiver has an interface board 65 by which microprocessor control signals are supplied transmitter/receiver 12 on a control bus 66. Further, the received signal at antenna 14 is controlled by a switch 67 which divides the signal into azimuth (AZ) and elevation (EL) components which are then provided as inputs to receiver section 22. The in-phase (I) and quadrature-phase (Q) outputs of the receiver section are provided as inputs to an analog-to-digital (A/D) converter 68. The converter periodically samples the signals being processed. For this purpose, timing signals are supplied to the converter from timing unit 28. The results of the sampling are supplied to a multiplexing unit 70 which outputs them from transmitter/receiver 12 on a video bus 72.

The video output signal on bus 72 from unit 12 is supplied to a radar interface unit 74 within processor 16. Microprocessor 24 control signals for the transmitter/receiver are routed to control bus 66 through this interface unit. The source of these control signals is a host central processing unit (CPU) 76 of the microprocessor installed in processor 16. Inputs such as operating frequency band, operating mode, sub-mode, etc. are provided as inputs to the CPU by the radar system via an appropriate data/command entry system indicated generally 78. The signal processing is performed by a plurality of signal processor elements 80. Three such elements 80a-80c are shown in FIG. 5; however, up to sixteen (16) such elements can be accommodated in processor 16. Thus, signal processing performed by the radar system is performed in parallel, not serially as in other radar systems.

A bus 82 runs between radar interface unit 74 and each of the processor elements. Additionally, the interface unit, signal processor elements, CPU, and interface modules 84, 86, are all interconnected by a processor bus 88. Module 84 is a display interface module for use with a display 18; while, module 86 is an input/output interface module for signal flow between the processor and other systems. Bus 88 is used for process control and low rate data transfers. Process control within the processor is such that bus 88 can support the sixteen processor elements 80 because even during its maximum use (which occurs during SAR or RBGM modes of operation) the usage factor is under twenty percent (20%).

At the start of each coherent array, CPU 76 generates a processor element number corresponding to the number of the mode or sub-mode comprising the array. This number is supplied to radar interface module 74 which is the input stage of processor 16. Module 74 then outputs all the data for an array in the coherent array onto data bus 82 with the address of one of the signal processor elements 80 in processor 16. At the same time, CPU 76 instructs each processor element 80 being used of the amount of data contained in the array it will be processing, the mode or sub-mode type which the array represents, and the type of signal processing to be performed. Each signal processor 80 then has a data processing time corresponding to the number of processor elements being used times a coherent array time. This period includes the time required for the CPU to read out the processed data from the processor. Because coherent array processing is done in parallel, each signal processor only has to be initialized at the start of a processing cycle and not a subsequent number of times as before. As a result, no data is lost. In addition, each array is independently processed.

Figure 7:
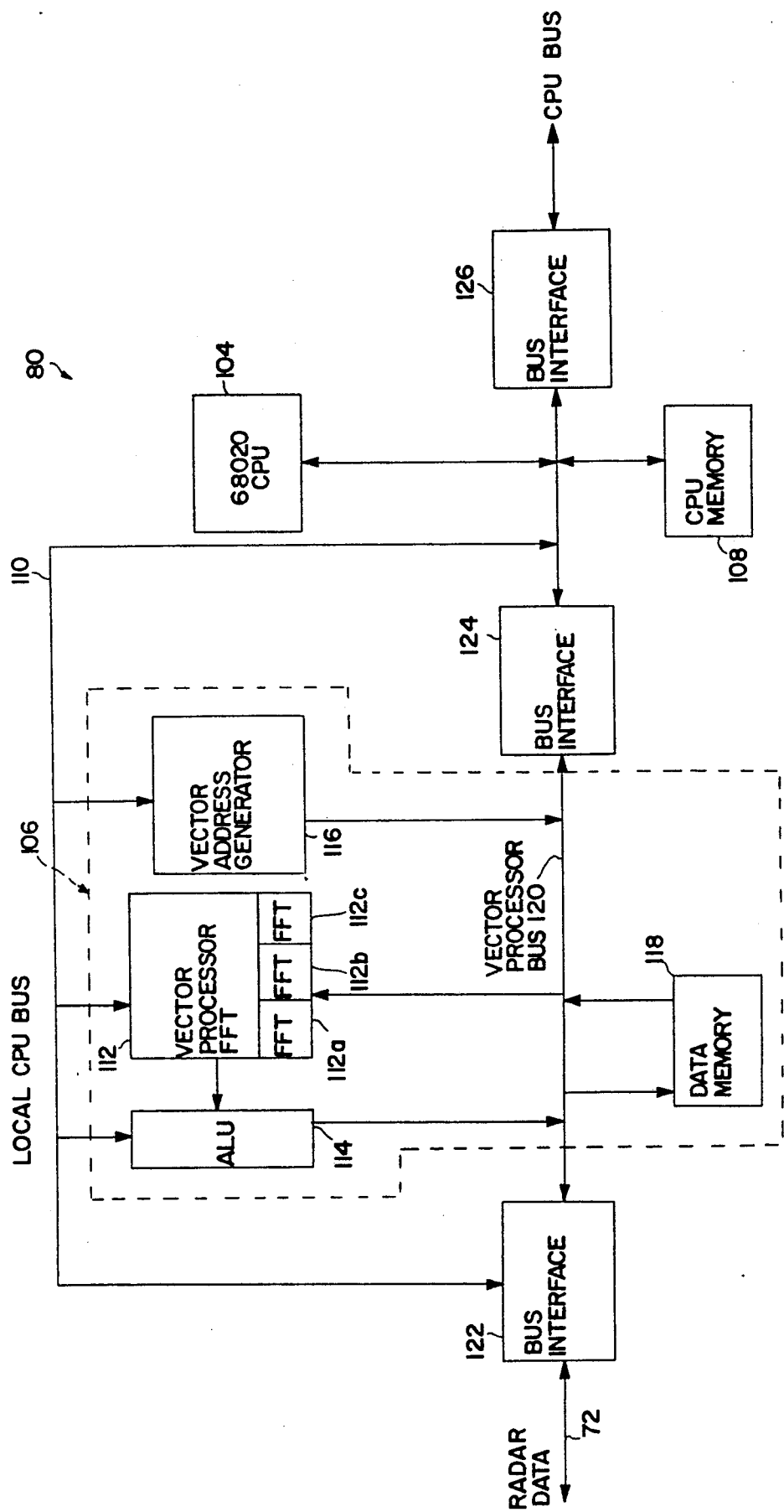
FIG. 7 is a block diagram of a signal processing element within the processor.

Referring to FIG. 7, the radar data bus 72 is a serial bus. The in-phase and quadrature-phase data transmitted over the bus is buffered and converted into a thirty-two (32) bit word containing an I/Q sample of thirty-two (32) bits. The processor element 80 to which the data is transmitted is, as noted, selected by microprocessor 24. The transfer rate is, for example, 20 MHz per 64 bit word. Each processor element 80 has its own central processor unit (CPU) 104. The CPU is primarily used with a high speed vector processor 106; although the unit can be used for general purposes as well. The CPU has an associated memory unit 108 for storing information and data required in its processing operations. Input and output signals to and from the CPU are routed over a local CPU bus 110. Vector processor 106 includes a vector processor FFT 112, and an arithmetic logic unit (ALU) 114. The processor utilizes a dedicated vector address generator 116 and a local high speed memory 118. Information between the various units is routed over a vector processor bus 120 Interfacing between the various external and internal buses is achieved by interface units 122, 124, and 126 respectively. Address generator 116 and data memory 118 help maintain a high data processing rate. For example, the address generator simultaneously produces both read and write addresses at a 20 MHz rate, the addresses being skewed so both read and write operations are simultaneously performed. In addition, the CPU programs the processor element for the next vector while the vector processing of the current waveform is being done. For this purpose, the CPU need only generate four (4) control words to reconfigure the element for the next vector.

Figure 8:
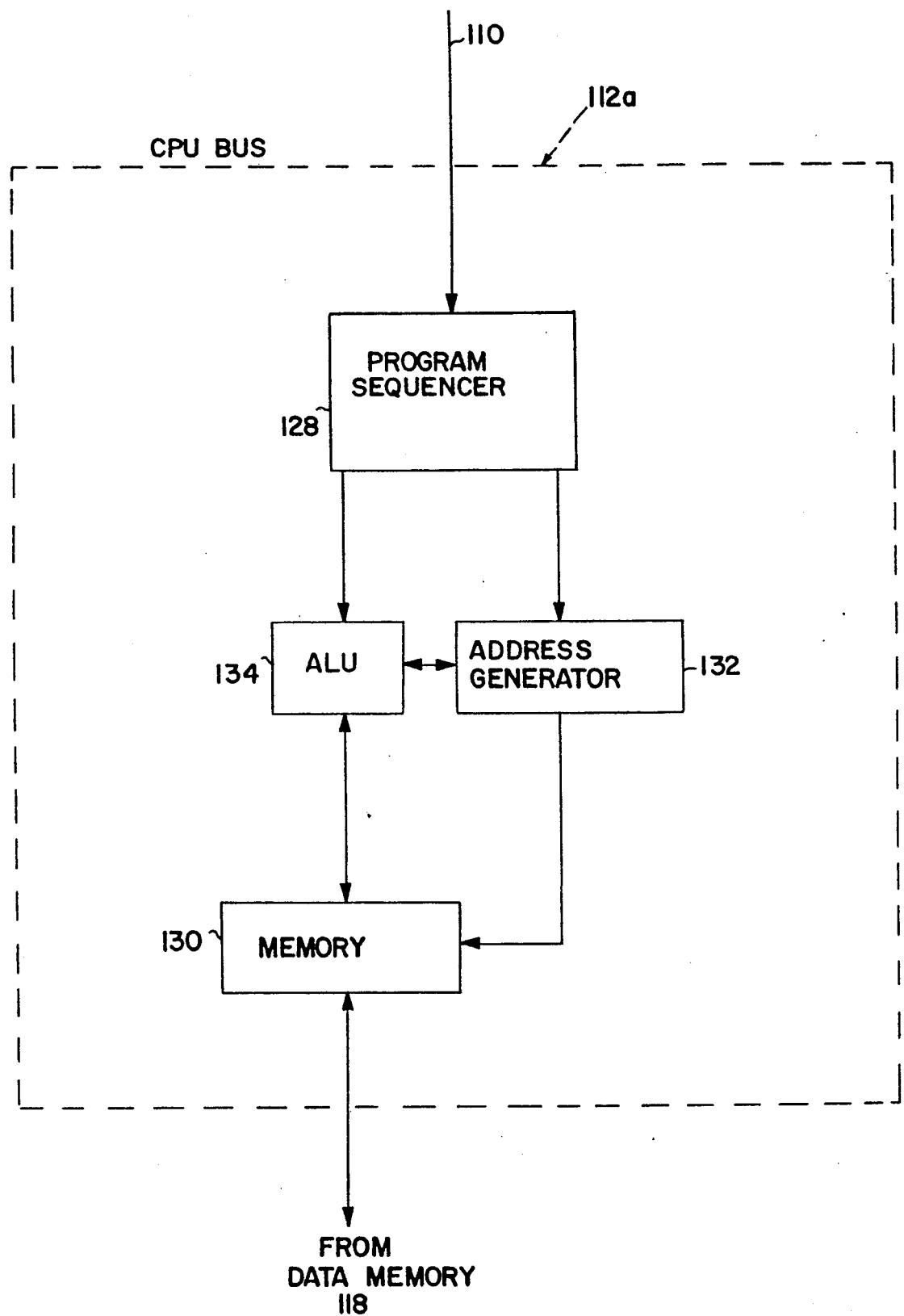
FIG. 8 is a block diagram representation of a Fast Fourier Transform (FFT) processing element used in the vector processor of FIG. 7.

FFT section 112 of vector processor 106 includes three (3) identical FFT units or engines 112a, 112b, and 112c respectively. Each engine operates independently of the others and is separately programmable by the CPU. As shown in FIG. 8, FFT 112a, for example, includes a program sequencer and address generator 128 which controls the operations performed within the FFT. The sequencer receives instructions from CPU 104 with respect to the operations to be performed in processing the next data vector. The FFT also has several memory units 130 RAM memory units 130a–130d) to which data inputs are supplied from memory 118, and to which the results of the FFT operations are supplied. The FFT also has auxiliary RAM memory units 132a, 132b. Sequencer/generator 128 is used to access memory 130 or 132 for data retrieval and storage. Lastly, the FFT has its own internal ALU 134 for performing the programmed set of instructions required for vector data processing. The FFT's utilize a very limited set of processing instructions to perform their operations. This results in the data processing being substantially faster than in other radar systems so parallel processing and multi-mode operations can be achieved without data being lost. Basically the FFT engines 112a, 112b, 112c are programmed with a minimum number of instructions to perform the following functions. These include FFT
Inverse FFT
Convolution
Add
Subtract
Multiply
And
Or
Exclusive Or (XOR)
Pass through.

With the functions listed above, FFT engines 112a, 112b, and 112c perform a sixteen (16) or thirty-two (32) bit block floating point real or complex FFT of any size up to a 65,536 point FFT. As an example of the FFT processing time, the three FFT engines can perform a 1024 point complex FFT in 72 usec.; or, a 1024 point convolution in 113 usec.

ALU 114 is a "pipeline" processor. Every vector sent through vector processor 106 is routed through ALU 114 and then is written back into data memory 118. The ALU operates at 20 MHz and is capable of performing 100,000,000 operations per second (100 MOP's). The computations performed by the ALU include Pass through
Magnitude/Normalized
Log base 2 of magnitude
Point-by-point power limiting (for anti-jamming)
Scaling with phase preserving overflow protection
Accumulated magnitude
Accumulated real part
Peak magnitude
Detections
Number of detections.

Many of the above listed functions can be performed simultaneously which minimizes the number of times data is passed through the ALU, and maximizes the use of the data memory bandwidth. In addition, the accumulated magnitude and peak magnitude of a vector is computed for every vector. The resultant values are then used to determine a scaling factor for the next data processing operation. This allows for adaptive data scaling in real time. Further, in performing its detection function, an output is provided by the ALU only for those points which exceed a given threshold, rather than for every input. This reduces the amount of data required for further processing.

Figure 9:
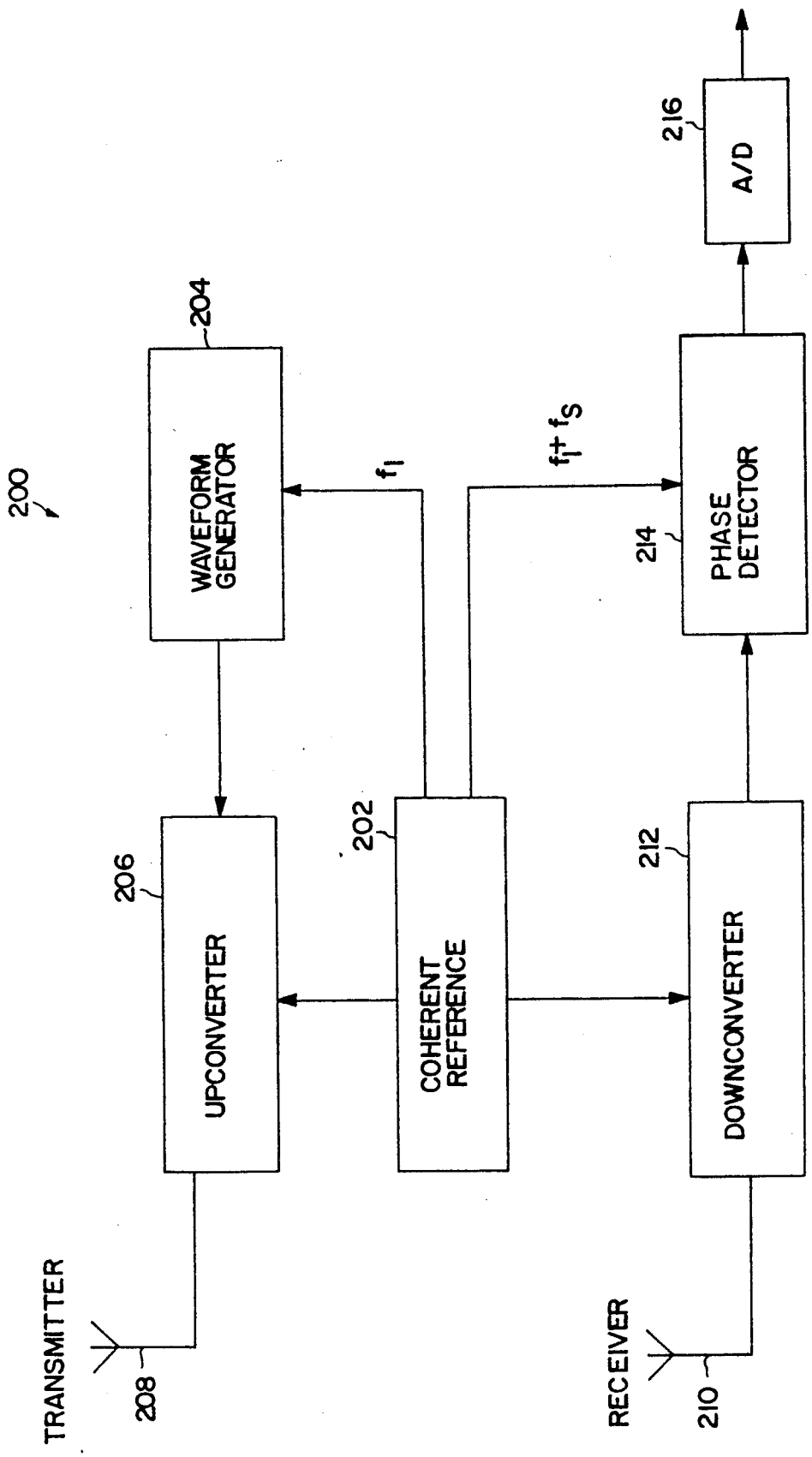
FIG. 9 is a block diagram of a prior art radar.

With respect to the method of the present invention, it will be appreciated that in prior art radar systems such as the radar 200 shown in FIG. 9, a coherent reference signal was generated at 202 and supplied to a waveform generator 204 and an upconverter 206. The waveform generator produced a complex modulated waveform which was modulated or impressed onto the carrier frequency f(1) and transmitted by transmitter 208. A return waveform is received by receiver 210 and down converted at 212 to a near zero frequency using a frequency offset f(s) supplied by reference 202 to a phase detector 214 to compensate for Doppler modulation of the signal. The resultant signal was then provided to an A/D converter 216 as a first step in processing of the resultant signal. Signal sampling usually occurs within a defined period of time which can be referred to as a "range window". Prior to beginning of this window, the sampling portion of a radar is inhibited because of signal transmission. At the close of the window, data is lost because the sampling electronics must be inhibited for the next transmission. As a result, targets which lie closer to the radar than distance represented by the start of sampling, or sufficiently far that the range window closes before the reflected signal reaches the radar, cannot be seen and are said to fall into a "blind zone". The period prior to the start of processing is referred to the "near range", and the period after close of the window as the "far range".

Figure 10:
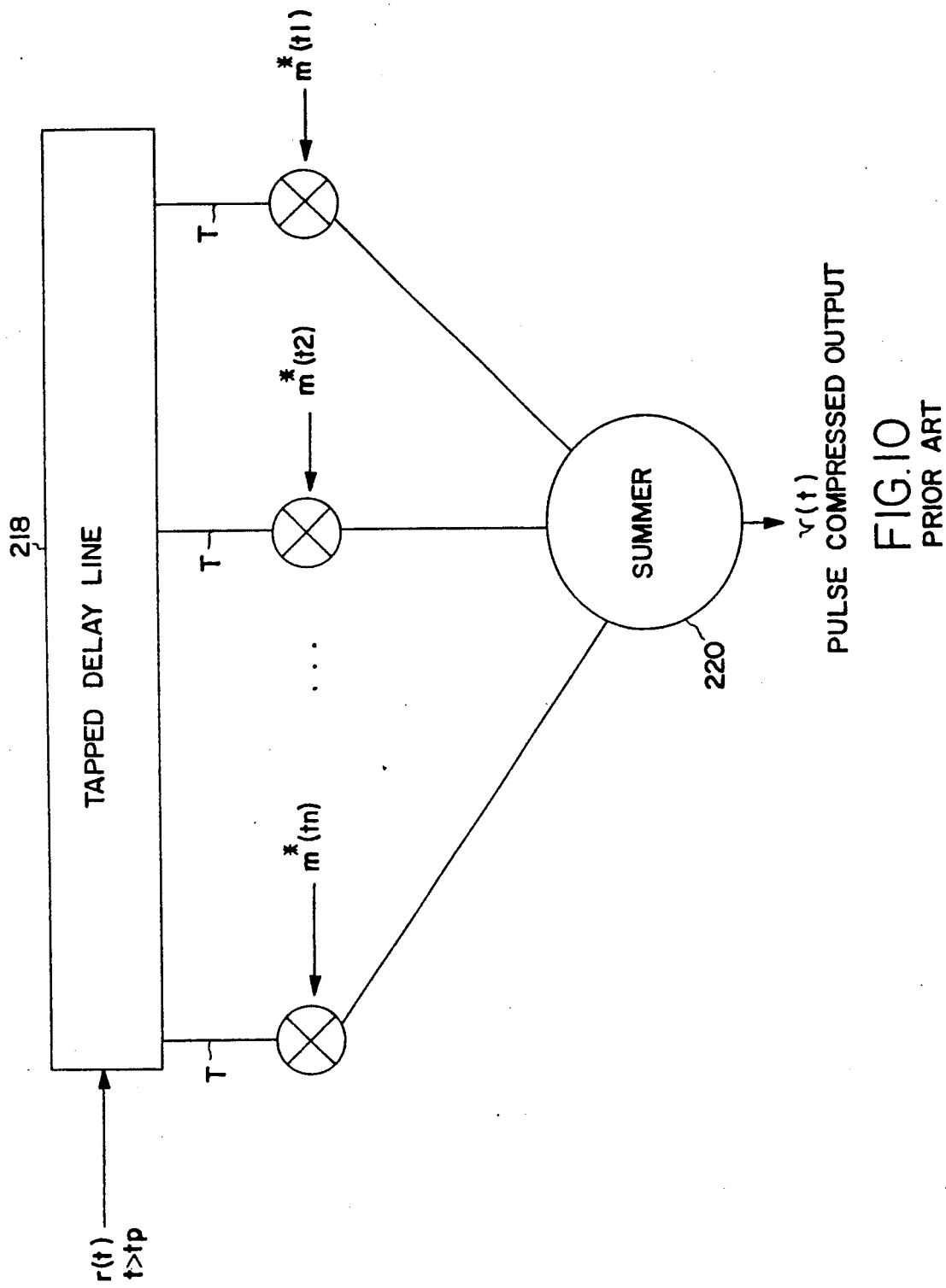
FIG. 10 illustrates a pulse compression technique used with the radar of FIG. 9.

Various types of pulse compression techniques have been utilized. As shown in FIG. 10, for example, the processor of radar 200 typically employs a tapped delay line 218, or its equivalent. A received signal r(t), starting at the end of the transmission period t(p), is applied to one end of the delay line. As the signal proceeds through the line, it is picked off at various tap points T. The tapped outputs m(t1), m(t2), ... m(tn) are directed to a summing point 220 and additively combined to produce a resultant signal v(t). This signal can be expressed as a complex conjugate of the summed inputs. It will be understood that for t 2t(p), v(t) is the autocorrelation function of the transmitted complex, modulated waveform. The signal will have a peak representing the location of a target. However, unless the peak occurs at a time greater than t(p), it will fall within the near range blind zone and not be seen. The range corresponding to the round trip delay of the transmitted waveform is the minimum detection range.

In keeping with the method of the present invention, the received, return signal, when delivered to a processor element 80 of radar 10 has a Fast Fourier transform performed on it in one of the FFT engines 112. This converts the signal from the time to the frequency domain. In performing this step, a string of zeros is added to the received signal. Zeros are added in front of the data if the pulse is to be processed for target locations within the near zone, or at the end of the data if for target locations in the far blind zone. As a result, the data samples will have the form of a vector r such that:

$$r = (0, 0, \ldots 0, r(t1), r(t2), \ldots, r(tn), 0, 0, \ldots 0)$$

Normally, the length n of a received sample vector is the pulse code length n(p) plus a desired range window length $n(r) - 1$. That is, $n = n(p) + n(r) - 1$. However, with the method of the present invention, a leading string of k zeros is added in order to see k sample times back into the near blind zone, and a trailing string of l zeros is added in order to see l sample times into the far blind zone. This makes the vector length equal $k + n + l$. In addition, it is a feature of the method of the invention that the total vector length add up to a power of two (2). If the vector length comprised of $k + n + l$ does not, then j additional trailing zeros are added to the vector so its total length n(f) is given as $$n(f) = k + n + l + j$$

Next, a weighted pulse code vector c is formed such that:

$$c = (w(t1)m(t1), w(t2)m(t2), \ldots$$
$$, w(t(n(p))m(t(n(p)), 0, 0, \ldots, 0)$$

where m(t) is a complex coded transmitted pulse waveform, and w(t) is a weighting function for antenna sidelobe control.

For pulse code processing in accordance with the method of the invention, both a Fourier transform matrix F, and an inverse Fourier transform matrix $F(-1)$ are created. The respective input vectors r, and c are then combined with matrix F, and their products, in turn, with the inverse matrix. This produces an output z which is an n(f) dimensional vector of cross correlation outouts, i.e., $$z = F(-1)((Fr)(Fc)).$$

The first k output samples correspond to range bins within the near blind zone, the next n samples to range bins within the range window, and the next l samples to range bins in the far blind zone. Any samples beyond $k + n + l$ are discarded.

To accomplish the above within a processor element 80, refer again to FIG. 7. CPU 104 puts the complex conjugate of the transform of vector c into the FFT auxiliary memory 113. This is done by having vector address generator 116 generate sequential read addresses starting at the location of (Fc) within data memory 118. Signal samples from each transmitted pulse in a coherent array are received on bus 72 and transferred to memory 118 as successive row vectors in a data matrix. When each row vector has been received, CPU 104 commands vector address generator 116 to transfer k values from a memory location containing a zero to vector processor 112. This zero value transfer is then followed by the length n row vector just received Next, $l + j$ zeros from the memory location are transferred to the vector processor. The CPU then commands the vector processor to compute, in sequence, (Fr), then (Fr)(Fc), then $z = F(-1)(Fr)(Fc)$. The vector address generator then stores the components of the computed output vector z back in data memory 118. The locations within memory 118 in which the components of the vector are stored are for the same row in which the signal samples were initially stored. The result is a pulse compressed output as one row of an output data matrix for each transmitted pulse.

After the last pulse, the n(ff)th pulse, has been received, a main filter bank FFT of length n(ff) is computed. This is done for MTI processing. For this operation, a weighting function vector y is transferred from data memory 118 to vector processor 106 by vector address generator 116. This vector is given as $$y = (w(t1), w(t2), \ldots, w(tn(ff)))$$

and is stored in memory 113. Next, each data column is transferred from memory 118 to processor 106. The vector processor then performs a premultiplication, point-by-point, of the input column vector points by the weighting function stored in memory 113. This produces a resultant vector x. Vector x is Fourier transformed to produce the vector $y = Fx$, and vector y is now transferred back to memory 118 as a new column vector. The above steps are repeated until $k + n + l$ column vectors have been processed. It will be noted that both pulse compression and computation of the main filter bank FFT are performed with the same vector processor.

Figure 11:
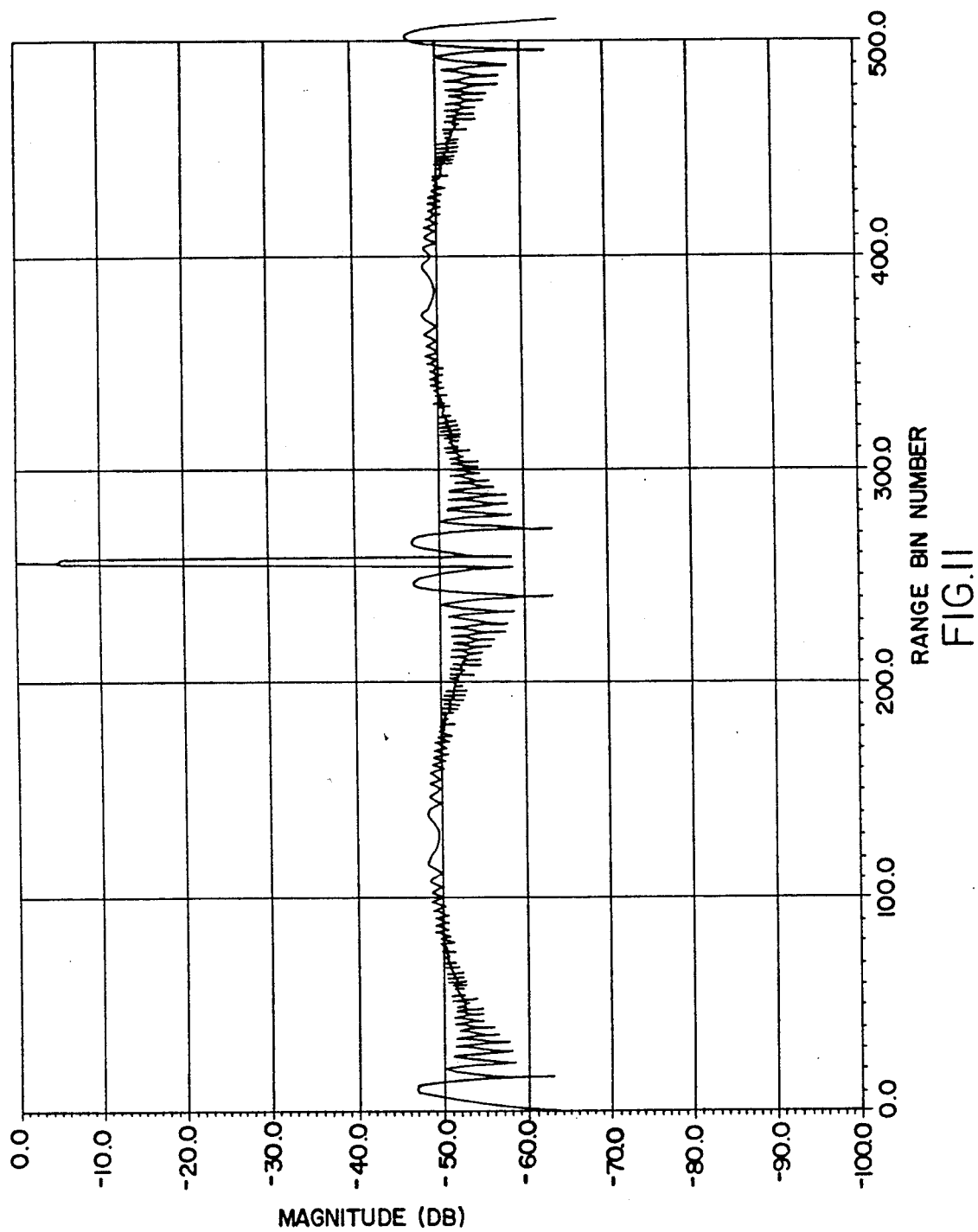
FIGS. 11 and 12 represent pulse compressed outputs from point targets wherein the number of range bins is 256 and 32 respectively; and, FIGS. 13 and 14 respectively represent the effects of pulse compression in the blind zone for transmitted pulses when the number of range bins respectively corresponds to those of FIGS. 11 and 12.
Figure 12:
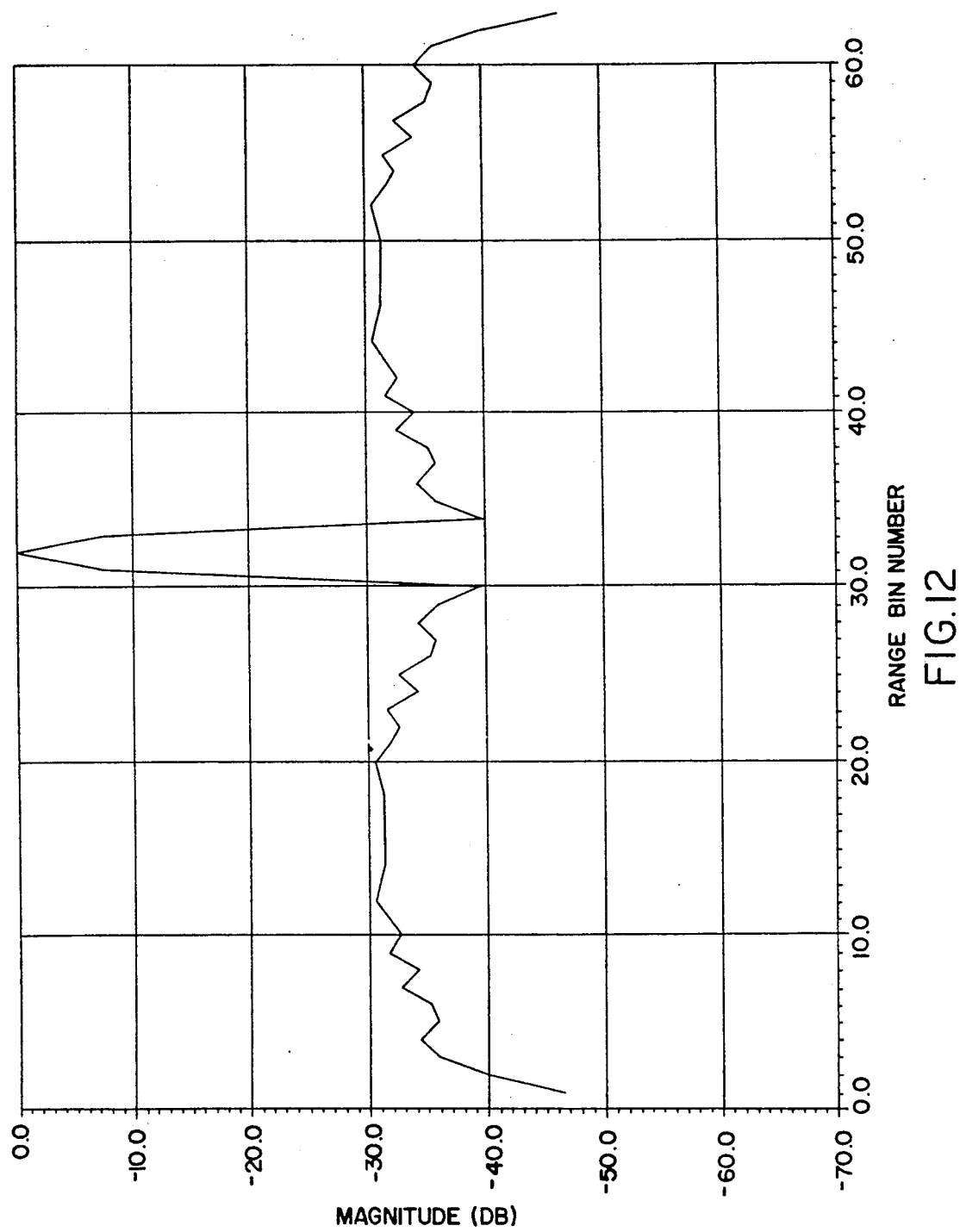
Figure 13:
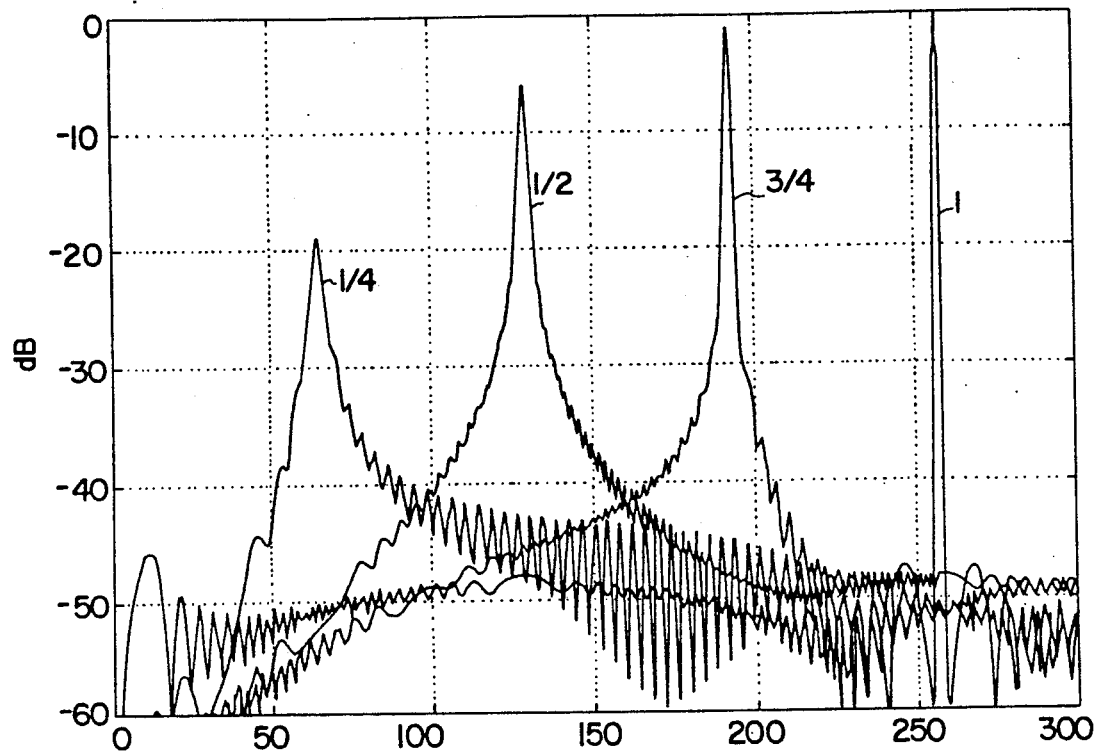
Figure 14:
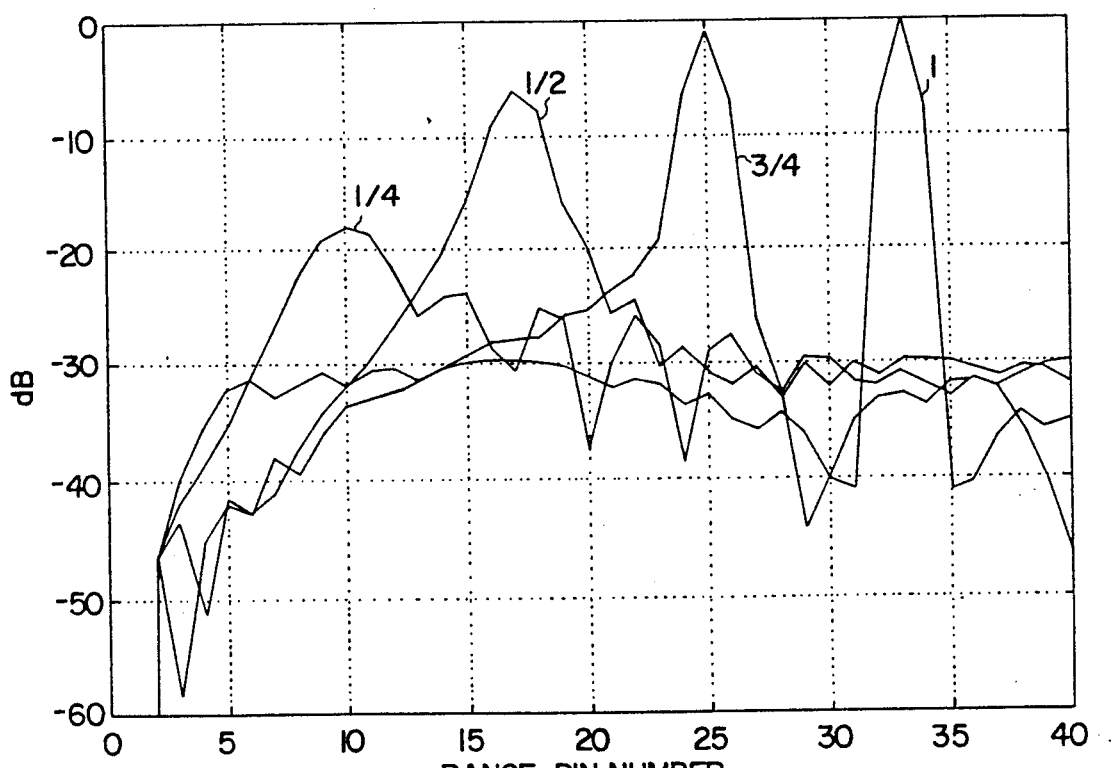

Referring to FIGS. 11 and 12, examples of pulse compressed outputs are shown for a pulse length n(p) of 256 (FIG. 11) and 32 (FIG. 12). In each instance, the transmitted pulse is a linear FM coded pulse waveform, and the weighting function is a Hamming weighting. Referring to FIGS. 13 and 14, responses in the near blind zone for n(p)=256 (FIG. 13), and n(p)=32 (FIG. 14) are shown for point targets which are respectively $\frac{1}{4}$, $\frac{1}{2}$, $\frac{3}{4}$, and 1 times the transmitted pulse width. In each Fig., it will be noted that the peak pulse compressed output decreases nearly linearly from a maximum at a range bin corresponding to n(p). Further, for linear FM codes, the resolution degrades with distance back into the blind zone. It is clear, however, that target detection can be achieved in this region even for targets as back as $\frac{1}{4}$ the pulse width. This is three-fourths of the way into the blind zone.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A method of signal processing for use in high duty factor radars for detecting targets at ranges both shorter and longer than a range window comprising:
    transmitting a coded pulse coherent array waveform and receiving as a return signal a waveform reflected off a target regardless of its range from the radar;
    sampling the reflected waveform to produce a resultant vector;
    adjusting the length of the resultant vector to shift the location of target information within the vector;
    converting the vector into the frequency domain; and,
    processing the vector to obtain target information which would have been in a "blind zone" because the distance of the target from the radar is such that it occurs in an interval when sampling is not done because of waveform transmission.

2. The method of claim 1 wherein converting the received waveform into the frequency domain involves performing Fast Fourier Transforms.

3. The method of claim 2 wherein changing the length of the vector involves adding one or more zeros in front of the vector data, the addition of the zeros shifting the data so that during processing, data which formerly would have fallen into a near blind zone and not been processed, now is processed.

4. The method of claim 3 wherein changing the length of the vector further includes adding one or more zeros at the rear of the vector data, the addition of the zeros further shifting the data so that data which formerly would have fallen into a far blind zone and not been processed, now is processed.

5. The method of claim 4 wherein the total vector length, after addition of the zeros, is represented as a power of two.

6. The method of claim 4 wherein processing the vector involves performing an inverse Fourier Transform.

7. The method of claim 6 wherein the processing further includes a generating an n-dimensional vector of cross correlation outputs from the matrix, a first portion of the cross correlation vector representing samples occurring prior to the range window, a second portion of the cross correlation vector representing samples from within the range window, and a third portion of the cross correlation vector representing samples occurring beyond the end of the range window.

8. A signal processing method for radar detection of targets at ranges both shorter and longer than a range window defined by a transmitted pulse having a defined pulse length comprising:
    transmitting a coded pulse waveform and receiving as a return signal a waveform reflected off a target;
    sampling the reflected waveform to produce a resultant data vector;
    modifying the length of the resultant frequency domain vector to shift the location within the vector of target information;
    converting the modified vector into the frequency domain; and,
    processing the vector to obtain the target information which may appear within range bins representing distances in front of the range window as well as within range bins representing distances beyond the range window thereby to eliminate "blind zones" with respect to target locations.

9. The method of claim 8 wherein converting the received waveform into the frequency domain involves performing Fast Fourier Transforms.

10. The method of claim 9 wherein changing the length of the vector involves adding one or more zeros in front of the vector data, the addition of the zeros shifting the data so that during processing, data which formerly would have fallen into a near blind zone and not been processed, now is processed.

11. The method of claim 10 wherein changing the length of the vector further includes adding one or more zeros at the rear of the vector data, the addition of the zeros further shifting the data so that data which formerly would have fallen into a far blind zone and not been processed, now is processed.

12. The method of claim 11 wherein the total vector length, after addition of the zeros, is represented as a power of two.

13. A signal processing method for processing data contained within a signal but in which part of the signal is missing because it falls outside a data sampling window comprising:
    converting the resultant data vector in which the data is contained from the time domain into the frequency domain; and,
    adding a first block of information at the front end of the data, and a second block of information at the rear end thereof, the addition of said blocks shifting the data sufficiently so it falls within the processing window;
    processing the resultant data signal to obtain the desired information which now falls within the data processing window.

14. The method of claim 13 wherein the respective blocks of information are each comprised of zeros.

15. The method of claim 13 wherein the resultant length of the data can be expressed as a power of two.

16. The method of claim 13 wherein conversion of the data to the frequency domain involves using Fast Fourier transforms.

* * * * *